UNITED STATES PATENT OFFICE.

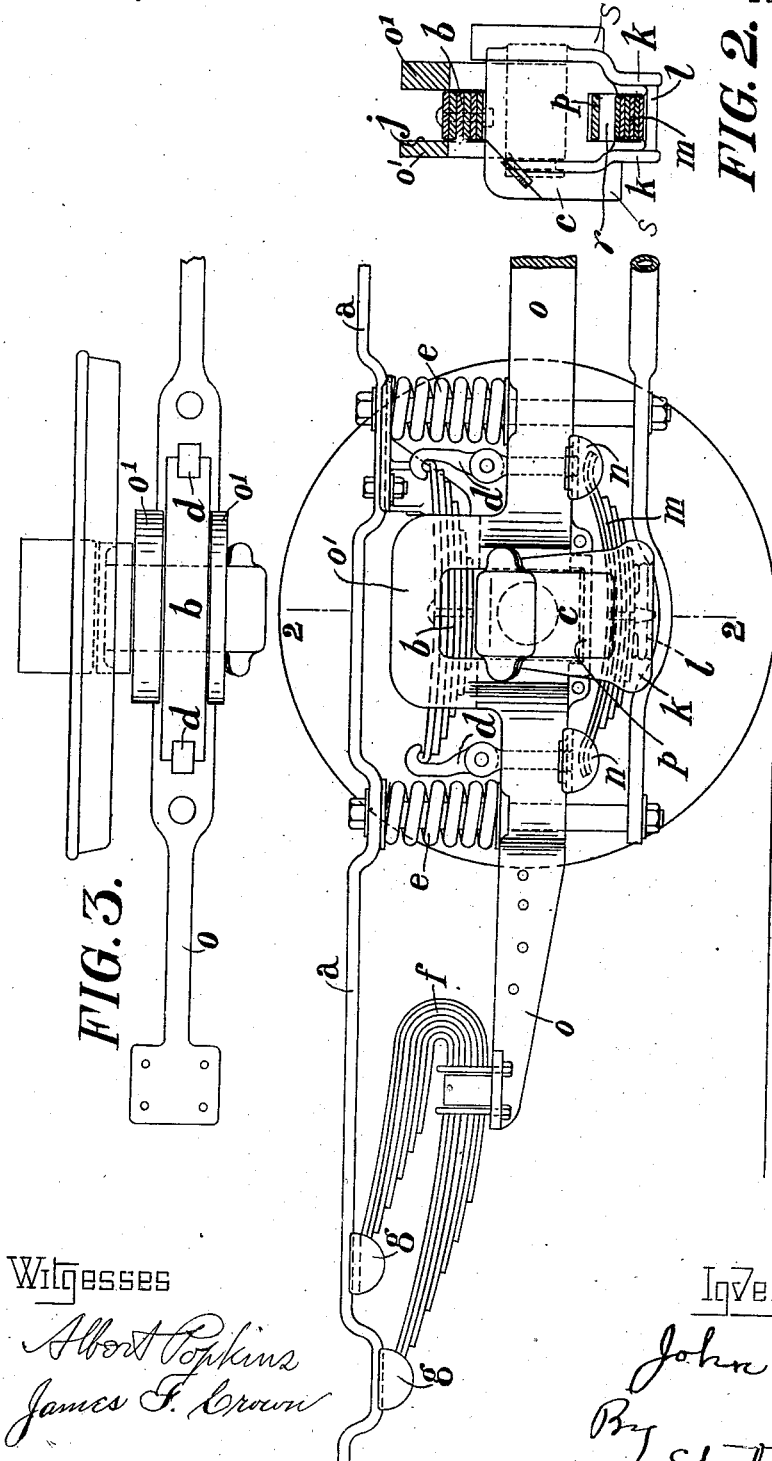

JOHN EDWARD ANGER, OF PRESTON, ENGLAND.

TRAM-CAR OR OTHER LIKE VEHICLE.

No. 906,362.     Specification of Letters Patent.     Patented Dec. 8, 1908.

Application filed August 5, 1907. Serial No. 387,198.

*To all whom it may concern:*

Be it known that I, JOHN EDWARD ANGER, a citizen of the United States of America, residing in Preston, in the county of Lancaster, in the Kingdom of England, works manager, have invented certain new and useful Improvements in or Relating to Tram-Cars or other Like Vehicles, for which application has been made in Great Britain, No. 27,731, dated December 5, 1906.

This invention has for its object a spring arrangement for tramcars and other like vehicles which will secure smoothness and uniformity of motion either with a light load or with a heavy load, such as cars with top covers on, which are coming in general use, and also prevent or greatly reduce oscillation.

The invention will be best understood with reference to the accompanying drawings, in which, Figure 1 is a side elevation of the spring arrangement at one end of the vehicle; Fig. 2, a sectional view on the line 2—2 Fig. 1; Fig. 3 a plan, Fig. 4 a sectional plan.

In carrying the invention into effect, the weight of the vehicle $a$ is borne by laminated springs $b$ placed on the top of each axle box $c$ and coupled at their ends to the frame $o$ by suspension bolts $d$, also by spiral springs $e$ resting on the frame $o$ at each side of the axle box and by laminated springs $f$ bolted at the extreme end of the frame $o$. These latter support the overhang of the body at the ends, and are bent into C form, and their ends rest in shoes $g$ on the under side of the car. The consequence is that they form a better support for the overhanging ends of the car than laminated springs of the usual elliptical type, and greatly reduce oscillation. The frame is formed adjacent to each axle box with a guard or guide $o$ which permits vertical motion of the axle box but restrains movement in any other direction, and on the top portion of the frame adjacent to each axle box a jaw $j$ is provided. The guard or guide $o'$ is formed by thickening the frame $o$, adjacent to each axle box, as shown in Fig. 4, and it is this thickened part which is slotted at the top to form the jaw $g$. Placed on the top of the axle box $c$ and guided by this jaw $j$ is the laminated spring $b$ first mentioned, the jaw holding it in position and preventing sidewise movement. Extending down from, and below each axle box are wings $k$, and these wings are united below the axle box by forming a spring seat $l$ cast solid with journal box so as to leave between it and the axle box $c$ a free passage or opening. Through each of these openings an auxiliary laminated elliptical spring $m$ is passed, and bolted down on to the bottom of journal box, and there are shoes $n$ secured to the under side of the frame, to receive the ends of the spring.

Under normal conditions the weight of the vehicle is borne by the laminated springs $b$ on the top of the axle box, by the spiral springs $e$ at each side thereof and the C springs $f$ at the end of the frame. When however a heavy load is applied, the said load will overcome the said springs, and the frame will descend until its shoes rest and are supported by the ends of the auxiliary laminated springs $m$ below each box. The car will then be supported by the auxiliary springs in addition to the other springs, and thus the increased load will be supported, and an easy and resilient motion to the vehicle will be obtained. Consequently whether the vehicle is lightly loaded or heavily loaded, the concussions will be absorbed by the springs, and a smoothness of running will be obtained not usually experienced, also oscillation is greatly reduced.

Hitherto when auxiliary springs have been used, they have been in action the whole time. The springs $m$ in my construction normally do not touch the shoes $n$ at all, but there is a clearance $n'$ between them. It is only under a heavy load that the shoes $n$ rest upon the ends of the springs $m$.

The horn plates $o'$ are provided at the bottom with a distance piece $p$ for strengthening purposes and to keep the jaws at an equal distance apart. In order to give the frame free movement when the car is in motion, and to prevent the distance piece $p$ from striking against the axle box, I form in the bottom of the axle box a channel $r$ with oil wells $s$ on each side. By this arrangement I provide a sufficient oil well and yet enable the bottom of the axle box to extend below the top of the spring $m$ and permit of the distance piece being located above the bottom of the axle box.

It will thus be seen that by my construction the weight is carried directly over and under the journal boxes whereby steady and easy running is obtained. It will also be seen that by my construction, a longer body portion than usual may be carried with little or no oscillation.

By my construction wherein the journal box is provided with a divided oil well, a distance piece may be placed between the horn plates thus preventing the horn plates from binding the journal box and causing unnecessary wear.

I declare that what I claim is:—

1. In a tram car or other like vehicle, a laminated spring bolted at the extreme end of the frame and bent into C form, so that both its ends bear in shoes at the under side of one part of the car.

2. In a tram car or other like vehicle, an axle box open at the bottom to form a seat for the laminated supplementary spring, also a channel for the distance piece above the laminated spring, and oil wells at either side.

In witness whereof, I have hereunto signed my name this 26th day of July, 1907, in the presence of two subscribing witnesses.

JOHN EDWARD ANGER.

Witnesses:
  HERBERT WILLIAMS,
  THOMAS S. SHILLINGTON.